Patented Jan. 17, 1939

2,143,956

UNITED STATES PATENT OFFICE 2,143,956

SOLUBLE AZO DYESTUFFS

Mordecai Mendoza and George Stuart James White, Blackley, Manchester, England, assignors to Imperial Chemical Industries Limited, a corporation of Great Britain No Drawing. Application June 3, 1937, Serial No. 146,314. In Great Britain June 4, 1936

7 Claims. (Cl. 260—198)

This invention relates to the manufacture of new azo dyestuffs and their application in the dyeing of furs, pelts, hair and the like materials; and especially to soluble azo dyestuffs made by coupling diazotized 4-amino-4'-nitro-diphenylamine-2'-sulfonic acid with a class of amino naphthol compounds.

It is among the objects of the invention to provide new azo dyestuffs which are soluble in water. Another object of the invention is to provide dyes which can be used to dye furs, hair animal fibres and the like to give dyeings of level shades having good fastness to rubbing. Another object of the invention is to provide processes for preparing the new dyestuffs. Other objects of the invention will be apparent from the following description.

According to the invention we manufacture new dyestuffs by coupling diazotized 4-amino-4'-nitro-diphenylamine-2'-sulphonic acid with an aminonaphthol devoid of sulphonic or carboxylic groups or with an N-substituted derivative thereof.

As N-substituted coupling components we may use, for example, N-alkyl, N-hydroxyalkyl, N-aryl or N-acylamino-naphthols.

Also according to the invention new and valuable colorings are produced on furs, pelts, hair and the like materials by dyeing with the said new dyestuffs.

The new dyestuffs of the present invention are soluble in water. They have good affinity for fur on which they give valuable level shades of good fastness to rubbing.

Furs, pelts, hair or the like materials which are to be dyed according to the invention may previously be submitted to the so-called "killing process", that is treatment with alkaline agents such as soda ash, ammonia, lime or caustic soda in order to degrease and purify the materials and make them more receptive of the dyestuffs to be applied. Where such "killing process" is to be followed by a chrome tannage treatment it is desirable first to remove from the materials any residual alkali remaining from the said "killing process". This may conveniently be done by rinsing the materials in a weakly acid bath.

It is advantageous to subject the furs or pelts before dyeing to a treatment (for example, the so-called "chrome tannage process") with agents which enable the cutaneous portions to withstand the effect of moderately raised dyeing temperatures. Such agents are, for example, chrome alum, alkali-bichromates and basic chromium sulphate. As is well known, furs or pelts which have been submitted to such chrome tannage processes tend to become strongly acid during wet storage. It is advantageous to neutralize this acidity, for example, with sodium bicarbonate, to approximately pH 6 to pH 7 before commencing the dyeing operation. In the case of freshly chrome-tanned pelts neutralization is not generally necessary.

The furs, pelts, hairs and the like may be submitted, if desired, to a further pre-treatment with agents which increase the dyeing capacity of the hairy portions and promote even dyeing. Among such agents are hypochlorites, as in the so-called "chlorinating" process, or phosphates.

It is preferred to commence the dyeing process under approximately neutral conditions and subsequently to complete the exhaustion of the dyebath by addition of acids such as acetic or formic acids. If desired, inorganic salts, buffering agents, wetting or dispersing agents, may be added to the dyebath. The choice of dyeing temperature is dependent on the materials to be dyed, and the effect desired. When it is desired to obtain a homogeneous shade on unshorn furs which still retain the horny guard hairs, a dyeing temperature of approximately 75°-80° C. is to be preferred. In the case of shorn furs or pelts lower dyeing temperatures, for example, 55°-60° C., may conveniently be used to obtain homogeneous shades. Lower dyeing temperatures than those indicated may be used but at temperatures below 40° C. there is an increasing tendency for a larger proportion of dye-stuff to be taken up preferentially by the cutaneous parts of the fur or pelt. At temperatures higher than 80° C. the possibility of damage to the cutaneous parts is increased.

The colorings obtained according to the invention are characterized by solidity and evenness of shade and good fastness to light and rubbing.

The invention is illustrated but not limited by the following examples in which the parts are by weight.

Example 1

30.9 parts of 4-nitro-4'-aminodiphenylamine-2-sulphonic acid are dissolved in 400 parts of water containing 5.3 parts of anhydrous sodium carbonate and to the solution are added 6.9 parts of sodium nitrite. The mixture is heated to 45° C. and while stirring at this temperature 25.2 parts of concentrated hydrochloric acid (36%) diluted with 75 parts of water are slowly added. Stirring is continued until diazotization is complete and the diazo suspension is then cooled to below 10° C.

The cooled diazo suspension is then stirred into an ice-cold solution of 15.9 parts of 1,5-aminonaphthol in 300 parts of water containing 12 parts of sodium hydroxide. The coupling mixture, which remains alkaline to litmus throughout, is stirred for a further four hours. The dyestuff so-formed is isolated by warming the coupling liquor to 50° C. and adding common salt. The new dyestuff which is precipitated is filtered off, dried and ground. The new dyestuff is soluble in water and has good affinity for fur, which it dyes in brown shades of good fastness to rubbing.

The compound is represented by the formula:

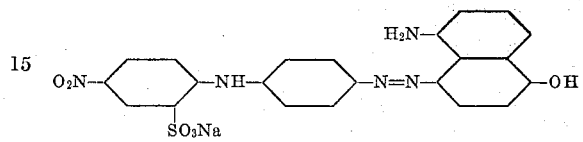

*Example 2*

A solution of 15.9 parts of 1,5-aminonaphthol in 300 parts of water containing 10.1 parts of concentrated hydrochloric acid (36%) is stirred into a cooled (10° C.) diazo suspension obtained as described in Example 1. Stirring is continued until coupling is complete (6–8 hours) when sufficient caustic soda solution is added to the resulting acid suspension of the dyestuff to make the coupling mixture alkaline to litmus paper. The temperature is raised to 50° C., common salt is added to precipitate the new dyestuff which is then filtered off, dried and powdered. The new dyestuff is soluble in water and dyes fur in violet shades of good fastness to rubbing.

The compound is represented by the formula:

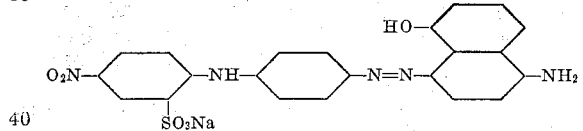

*Example 3*

By using instead of the coupling component of Example 1 the same amount of 2,7-aminonaphthol, there is obtained, with similar procedure, a new dyestuff which dyes fur in reddish shades.

The compound is represented by the formula:

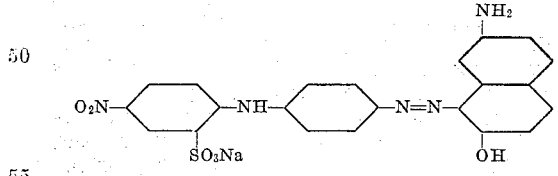

*Example 4*

100 parts (damp weight) of long-haired, chrome-tanned white rabbit fur are entered at 40° C. into a dyebath consisting of 1 part of the dyestuff of Example 1 dissolved in 3000 parts of water. The temperature of the dyebath is raised to 75° C. during 20 minutes and after 30 minutes at this temperature 1 to 1.5 parts of glacial acetic acid are added, followed, after a further interval of 30 minutes, by 0.5 part of 80% aqueous formic acid. Dyeing is then continued for a further 40 minutes at 75° C., the dyed fur is then removed, dried and drummed in hardwood sawdust for 2 to 4 hours. The resulting fur is colored on the under wool, the guard hairs and the skin in a brown shade of good fastness to rubbing.

*Example 5*

100 parts (damp weight) of shorn chrome-tanned white rabbit fur are entered at 40° C. into 3000 parts of water containing 1 part of the dyestuff obtained by coupling diazotized 4-nitro-4'-aminodiphenylamine-2-sulphonic acid in alkaline medium with an equimolecular proportion of 1-β-hydroxyethylamino-5-naphthol. The temperature of the dyebath is raised during 20 minutes to 55°–60° C. This temperature is maintained throughout the subsequent addition of glacial acetic and aqueous 80% formic acid in amounts and at intervals corresponding to those described in Example 4. The dyed fur is then dried and drummed in hardwood sawdust. The resulting fur has a brown shade which has good fastness to rubbing.

Further examples of dyestuffs obtainable according to the invention are given in the following table:

| Coupling component | Coupling medium | Shade on fur |
| --- | --- | --- |
| 1-dimethylamino-5-naphthol | Alkaline to litmus | Brown. |
| 1-acetylamino-5-naphthol | do | Violet. |
| 1-acetylamino-7-naphthol | do | Red-violet. |
| 2-phenylamino-7-naphthol | do | Red. |
| 1-β-hydroxyethylamino-5-naphthol | do | Brown. |

As many variations of the invention will be apparent to those skilled in the art and can be made without departing from the spirit and scope of the invention, it is to be understood no limitations are intended in the annexed claims except such as are specifically recited or are imposed by the prior art.

We claim:

1. The compounds represented by the formula

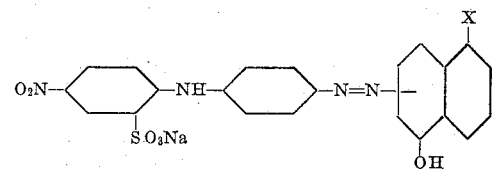

in which X is one of the group consisting of amino, phenylamino, dialkylamino, hydroxyalkylamino and acylamino.

2. A compound represented by the formula

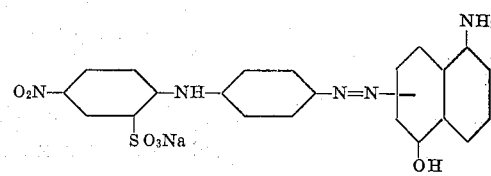

3. The compound represented by the formula

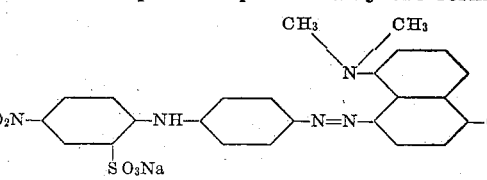

4. The compound produced by coupling 4-nitro-4'-amino-diphenylamine-2-sulphonic acid in alkaline coupling medium with 1-β-hydroxyethylamino-5-naphthol.

5. A dye obtainable by coupling diazotized 4-amino-4'-nitro-diphenylamine-2'-sulfonic acid to an azo dye coupling component of the group consisting of amino naphthols in which the amino and hydroxy groups are in the 1–5, 1–7 and 2–7 positions respectively, and the amino group is one of the group consisting of amino, hydroxyalkylamino, dialkylamino, acylamino, and phenylamino.

6. The process which comprises adding a mixture containing diazotized 4-amino-4'-nitro-diphenylamine-2'-sulphonic acid to an alkaline mixture containing 1,5-aminonaphthol, and maintaining the coupling mixture alkaline until coupling is completed.

7. The process which comprises adding a mixture containing diazotized 4-amino-4'-nitro-diphenylamine-2'-sulphonic acid to an acid mixture containing 1,5-aminonaphthol, and maintaining the coupling mixture acid until coupling is completed and then making the mixture alkaline to litmus.

MORDECAI MENDOZA.
GEORGE STUART JAMES WHITE.